United States Patent
Guo et al.

(10) Patent No.: US 10,705,781 B1
(45) Date of Patent: Jul. 7, 2020

(54) SYSTEM AND METHOD FOR ADAPTIVE AUTOMATED BEZEL TILING CORRECTION FOR MULTIPLE DISPLAY SOLUTION

(71) Applicant: Dell Products L.P., Round Rock, TX (US)

(72) Inventors: Lei Guo, Singapore (SG); Dengzhai Xiong, Singapore (SG); Boon Heng Koh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/254,006

(22) Filed: Jan. 22, 2019

(51) Int. Cl.
  *G06F 3/14* (2006.01)
  *G09G 5/00* (2006.01)

(52) U.S. Cl.
  CPC ........... *G06F 3/1446* (2013.01); *G09G 5/005* (2013.01); *G09G 5/006* (2013.01); *G09G 2300/026* (2013.01); *G09G 2340/045* (2013.01); *G09G 2354/00* (2013.01)

(58) Field of Classification Search
  CPC ...... G06F 3/1446; G09G 5/006; G09G 5/005; G09G 2300/026; G09G 2340/045; G09G 2354/00
  See application file for complete search history.

(56) References Cited

U.S. PATENT DOCUMENTS

| 9,298,413 B1 | 3/2016 | Karve et al. |
| 2006/0001593 A1 | 1/2006 | Baudisch |
| 2010/0033402 A1 | 2/2010 | Yoshida et al. |
| 2011/0164065 A1* | 7/2011 | Mate ..................... G06F 3/1446 345/676 |
| 2013/0176255 A1* | 7/2013 | Kim ..................... G06F 3/1423 345/173 |
| 2015/0370322 A1* | 12/2015 | Gustafson ............. G06F 3/1423 345/156 |

* cited by examiner

*Primary Examiner* — Aneeta Yodichkas
(74) *Attorney, Agent, or Firm* — Terrile, Cannatti & Chambers; Emmanuel A. Rivera

(57) ABSTRACT

A system, method, and computer-readable medium for performing bezel tiling correction for multiple displays that provides information regarding multiple monitor configuration of a computing system; provides bezel widths of monitors of the multiple monitor configuration; and performs bezel width correction on particular monitors of the multiple monitor configuration based a bezel tiling correction mode that aligns received frames/images that are displayed on the monitors.

20 Claims, 7 Drawing Sheets

SYSTEM AND METHOD FOR ADAPTIVE AUTOMATED BEZEL TILING CORRECTION FOR MULTIPLE DISPLAY SOLUTION

BACKGROUND OF THE INVENTION

Field of the Invention

The present invention relates to computer monitors. More specifically, embodiments of the invention relate to bezel tiling correction in multiple display configurations.

Description of the Related Art

Computing applications, including gaming applications, can implement multiple displays or monitors. To achieve seamless presentation to a user, borderless design can be implemented. Borderless designs allow a continuous and smooth transition and presentation between adjacent monitors or displays.

The use of multiple displays can be supported by software, such as by an operating system (OS) and information handling system (IHS). Also, multiple monitors or displays are supported by graphics cards with multiple outputs, such as high definition multimedia interface (HDMI), display port, video graphics display (VGA), digital visual interface (DVI), multi-stream transport using a single display port, etc.

A typical problem with monitors or displays, is picture or display misalignment between split border monitors or displays, due to bezel widths of the monitors or displays. Because monitors or displays can have bezel widths, adjusting monitors for particular applications, such as games, movies, spreadsheets, etc. that rely on seamless visual transitions between the monitors or displays, can be an annoying process to a user.

Typically, dedicated high-end graphics adapters or external video wall switch boxes with high-end graphics cards are implemented to generate higher resolution frame pixels. A user can be implement manual trial and error adjustment to compensate or correct for bezel width in a multiple monitor or display implementation. Bezel width correction can use high performance graphics cards to render a larger resolution frame and then a user manually shifts the screen frame by trial-and-error method to adjust frame edge pixels to be hidden by the monitor or display bezel.

The present solutions can need high computing graphics processing units (GPU) and relatively large memory resources to generate a higher resolution than native monitor or display resolution, and hide edge pixels to attain a bezel-compensated frame, where the higher resolution is sent to the monitor or display. The computing cost increases when the number of monitors or displays are increased in multiple monitor or display configurations. As discussed, manual trial and error adjustment can be needed. The time for manual trial and error adjustment increases, as the number of monitors or displays in a multiple monitor or display configuration increases. Furthermore, a user can desire to switch on/off, or implement different monitor or display bezel tiling corrections, for different applications, which cannot be easily implemented using current implementations.

SUMMARY OF THE INVENTION

A system, method, and computer-readable medium are disclosed for bezel tiling correction in multiple display configuration that provides information regarding multiple monitor configuration of a computing system; provides bezel widths of monitors of the multiple monitor configuration; and performs bezel width correction on particular monitors of the multiple monitor configuration based a bezel tiling correction mode that aligns received frames/images that are displayed on the monitors.

BRIEF DESCRIPTION OF THE DRAWINGS

The present invention can be better understood, and its numerous objects, features and advantages made apparent to those skilled in the art by referencing the accompanying drawings. The use of the same reference number throughout the several figures designates a like or similar element.

DETAILED DESCRIPTION

Figure 1:
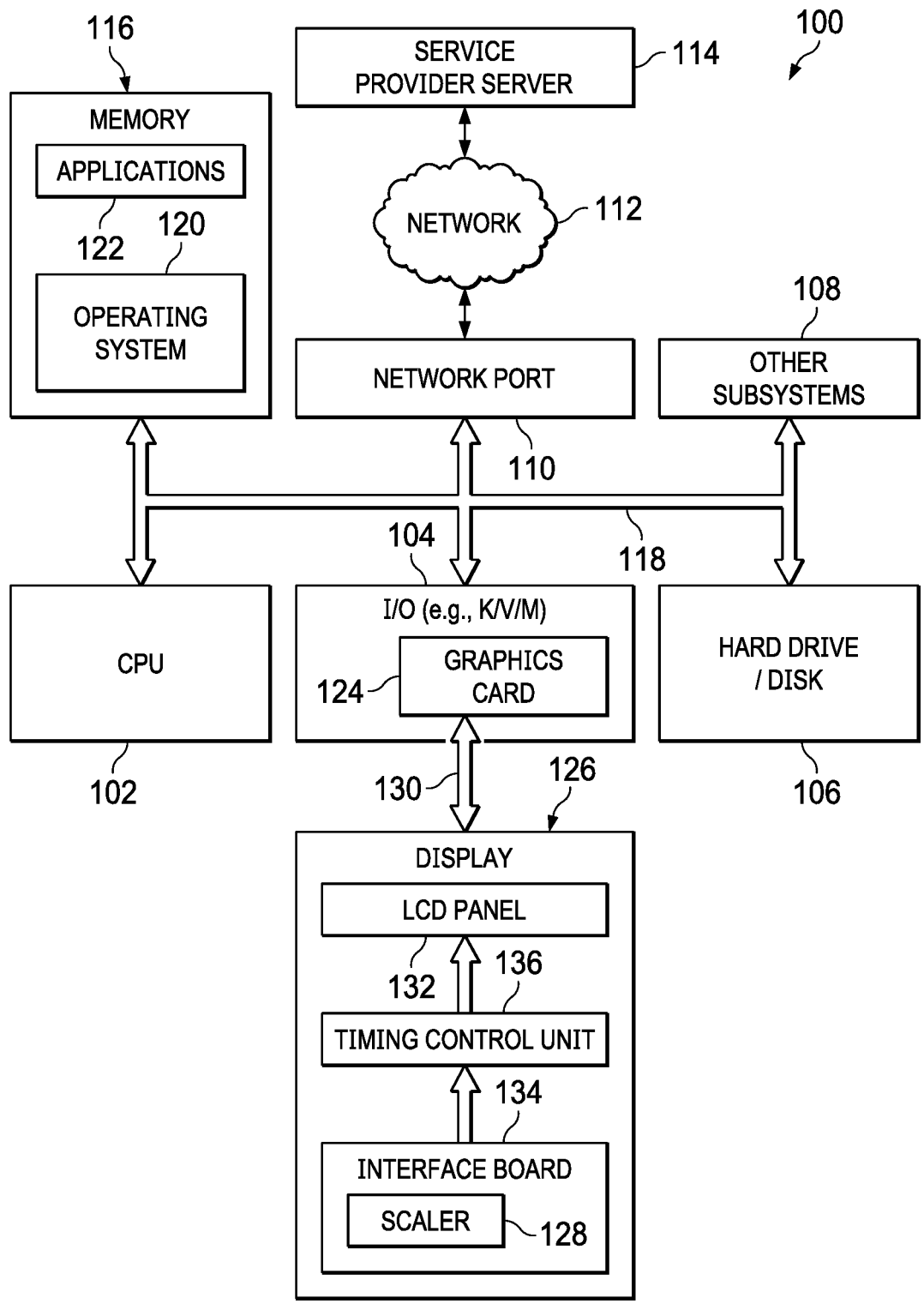
FIG. 1 shows a general illustration of a computing system as implemented in the system and method of the present invention.

A system, method, and computer readable medium are disclosed for performing bezel tiling correction in multiple display configurations. In various embodiments, two or more (multiple) monitors or displays are configured to operate with a computer or computing systems, where various applications, such as gaming software, spreadsheets, and movies/videos, etc. are provided by the computer or computing system to the multiple monitors or displays. In certain implementations, because of the bezels of the monitors or displays, correction or compensation is performed to provide continuous or seamless viewing on the multiple monitors or displays FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 112, which is likewise accessible by a service provider server 114. The information handling system 100 likewise includes system memory 116, which is interconnected to the foregoing via one or more buses 118. System memory 116 further includes operating system (OS) 120 and applications 122. The I/O devices 104 can include a graphics card 124. Applications 122 can include on screen display or OSD control software, where the OSD control software is able to read bezel data, display array position and automatically switch between bezel tiling correction preset modes (i.e., switch between bezel tiling correction and to non-bezel tiling correction when appropriate). The information handling system 100 includes one or more monitors or displays as represented by monitor or display 126.

In certain implementations, when the monitor or displays are configured into a multiple formed into an array, the position of each monitor or display can be acquired from the OS 118, such as a display setting in Windows® or other application such as a display utilities. The monitor or display's relative position can then communicate to the other monitors and displays of the configuration.

The OS 120 can also provide information on the application type of the video being rendered to the monitors or displays. Application types (e.g., Windows® media player, desktop, games, etc.) can be linked to different bezel tiling correction modes in the display firmware running by a scaler chip 128. For example, when switching the applications in Windows®, the bezel tiling correction mode can be automatically switched to a per pre-defined list.

Graphics card 124 can be connected to monitor or display 126 through one of various connections 130. For example, connections 130 can include video graphics array (VGA), display port (DP), digital visual interface (DVI)and high definition multimedia interface (HDMI), etc. The display 126 includes a liquid crystal display (LCD) panel 132. LCD panel 132 receives signals from an interface board 134. The interface board 134 can further include a backlight driver (not shown) and scaler chip 128. Scaler chip 128 provides various functions including supporting inputs from formats such as VGA, DP, DVI, HDMI, etc.—decoding such formats into digital pixel format and selecting appropriate ports to send the pixels in a pixel processing pipeline. The scaler chip 128 can be configured to process and execute non-transitory, computer-readable storage medium embodying computer program code, the non-transitory, computer-readable storage medium, the computer program code interacting with a plurality of computer operations and comprising instructions executable by the scaler chip 128.

The scaler chip 128 further can include other functions such as image processing, OSD insertion, and overdrive processing. Image processing can be used to improve image quality. OSD insertion can generate images that are superimposed onto other incoming images. Overdrive processing adjusts pixel values that are sent to the LCD panel 128 to compensate for dynamic behavior of the LCD elements on the LCD panel 128. The scaler chip 128 can include components (not shown) such a backlight controller, a CPU, and memory controller. In addition, the scaler chip can have an output interface to a timing control unit or TCON 130. The TCON 136 receives pixels from the interface board 134/scalar chip 128 in serial format and processes the pixels for the LCD panel 128.

In certain implementations, bezel tiling correction is achieved by using the scaler chip 128 to re-generate frame pixels from original graphics card 124 output. In general, the scaler chip 128 renders video frames to cover areas of the bezel. With bezel width and pixel pitch information stored within the display 126 system, the scalar chip 128 calculates a new resolution pixel based on a defined algorithm to adjust the extended display image/picture to overcome the split border across adjacent displays or monitors. In certain implementations, the OS 120 is used for adaptive implementation of pixel adjustment/bezel tiling correction in detecting how multiple displays or monitors are aligned (e.g., 3×1 portrait-flipped, or 2×2 landscape, or 2×1 portrait, etc.). Furthermore, the OS 120 can utilize user preset/predefined modes for smart application scene detection, to allow for the following: turn on/off bezel tiling correction (e.g., auto switch on bezel tiling correction when in desktop wall-paper and switch to non-bezel tiling correction when in an application such as Windows® Word or Excel), or switch to center-kept bezel tiling correction mode in an action adventure game, and switch to a standard bezel tiling correction mode when playing a movie.

In certain implementations, a bezel corrected frame/image is rendered or scaled by the scaler chip 128, instead of the graphics card 124. In certain implementations, the OSD control software reads bezel data, monitor or display position in a configuration and automatically switches between correction preset modes, such as switching to standard bezel correction when the OS 120 shows a desktop wallpaper and then switching to non-bezel tiling correction when running a particular application.

Over-scan is performed by scaling up a video frame/image to fit an area that covers the monitor or display panel and bezels. Over-scan can be referred to as scanning the active input video signal (i.e., valid content) into a wider area. The result will make some content near the edges of the frame/image shifted beyond the monitor or display's illumination area (i.e., phosphor raster/pixels), and therefore the visible content will be less and enlarged. For certain implementations, the scaler chip 120 performs the over-scan. In general, first, a video frame/image is cropped, such that after scaling up the remaining content will fill up all the active pixels of the display panel. Second, the cropped fame is scaled up as determined by a particular rendering style.

For a multiple monitor or display configuration, the scaler chip 120 performs the over-scan, also in two steps. First, the input video frame/image is cropped to throw away some pixels from left/right end of each line and/or throw away some lines from top/bottom. The resulting cropped frame is put into a buffer. The second step is to scale up the frame horizontally and/or vertically to fill up the display pixels. Scaling saves contents near the edges of the frame/image, as intended to stretch content over the bezels of the multiple monitor or display configuration. Cropping and scaling are further discussed below.

When the displays are formed into an array, the position of each display can be acquired from the operation system like Display Setting in Windows or other application like display utilities provided by graphics vendors. The display's relative position is then communicated to every display.

The OS 120 can also provide information on the application type of the video being rendered to the displays. Application types (such as windows media player, desktop, game) are linked to different bezel compensation modes. When switching the applications in windows, the bezel tiling correction mode can be automatically switched per pre-defined list.

Figure 2A:
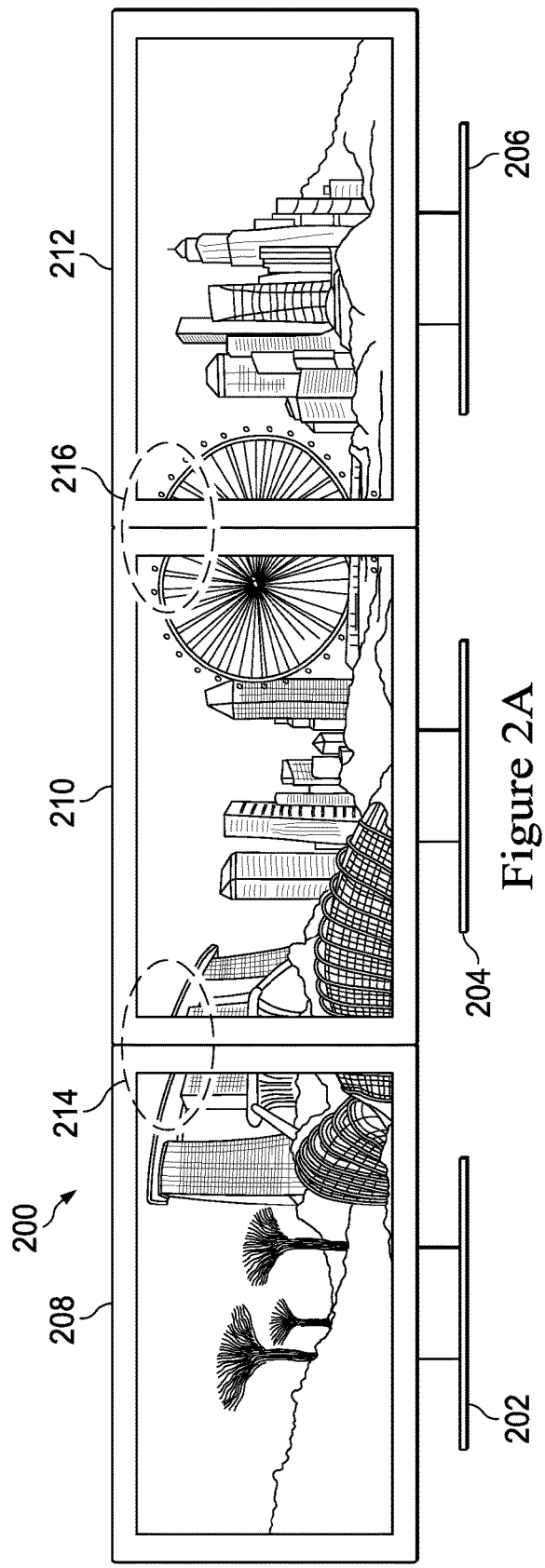
FIG. 2A shows a multiple monitor or display configuration without bezel tiling correction.

FIG. 2A is an example of a multiple monitor or display configuration 200 without bezel tiling correction. In this example configuration 200, monitors or displays 202, 204, and 206 are arranged in a 3×1 landscape layout (i.e., three monitors or displays across one level in landscape mode). Other configurations or layouts can also be implemented, such 3×1 portrait, 2×2 landscape, 2×1 portrait, etc. In this example, monitor or display 202 has a bezel 208, monitor or display 204 has a bezel 210, and monitor or display 206 has a bezel 212.

Without bezel tiling correction, it is evident from the scenes circled by sections 214 and 216 that image or scene discontinuity exists. The lines of the images of the circled sections 214 and 216 do not interpolate between the bezels 208, 210 and 212 to connect between the monitors or displays.

Figure 2B:
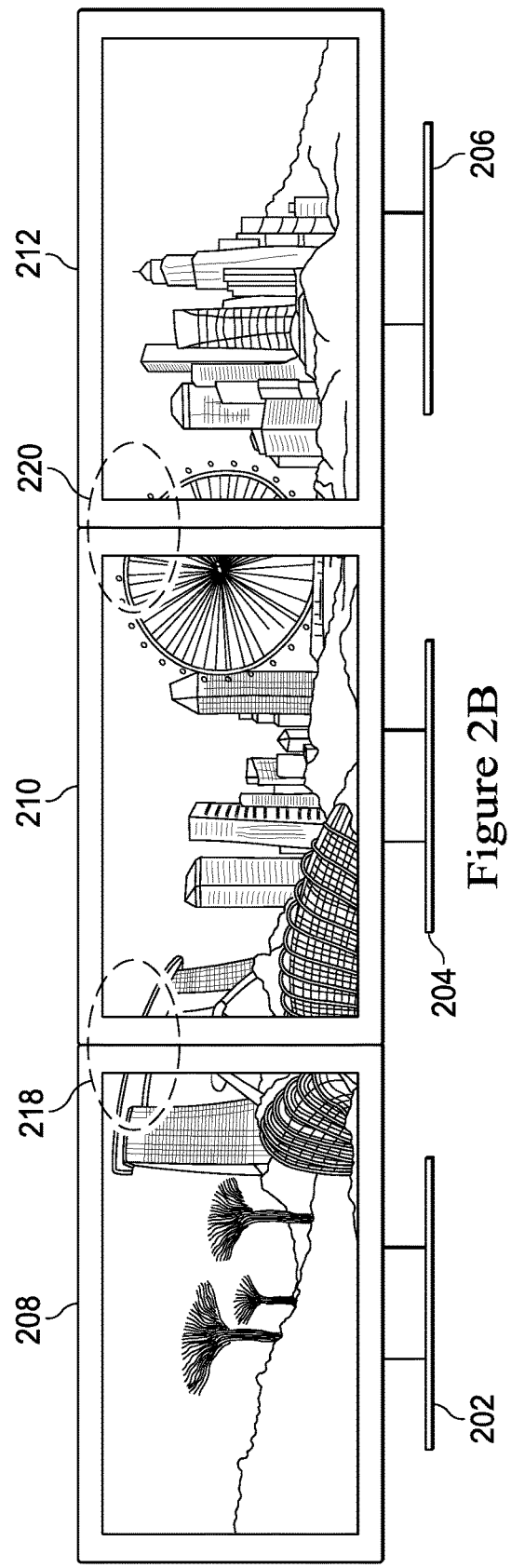
FIG. 2B shows a multiple monitor or display configuration with bezel tiling correction.

FIG. 2B is an example a multiple monitor or display configuration with bezel tiling correction. In this example, the configuration 200 is implemented, where monitors or displays 202, 204, and 206 are arranged in a 3×1 landscape layout. In this implementation with bezel tiling correction, the scenes circled by sections 218 and 220 show continuity of the images or scenes. In other words, compensation/correction performed on the bezels 208, 210 and 212 to interpolate the displayed images or scenes.

Figure 2C:
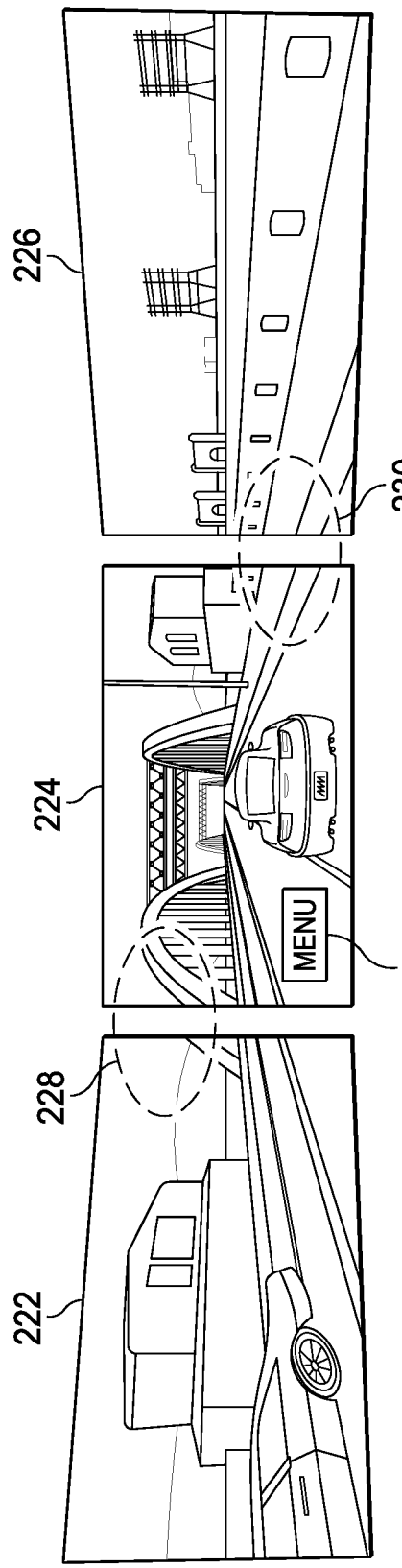
FIG. 2C shows a multiple monitor or display configuration without bezel tiling correction for an action adventure game.

FIG. 2C is an example of a multiple monitor or display configuration without bezel tiling correction for an action adventure game. In this example, the monitors or displays 222, 224, and 226 in a 3×1 landscape layout. An action adventure game is displayed. It is desirable to maintain bezel tiling correction for the center of the 3×1 landscape layout of the monitors or displays 222, 224, and 226 to maintain continuity of the images or scenes that are displayed for the game. It is evident in the areas circled by sections 228 and 230 that discontinuity of images and scenes exists.

Figure 2D:
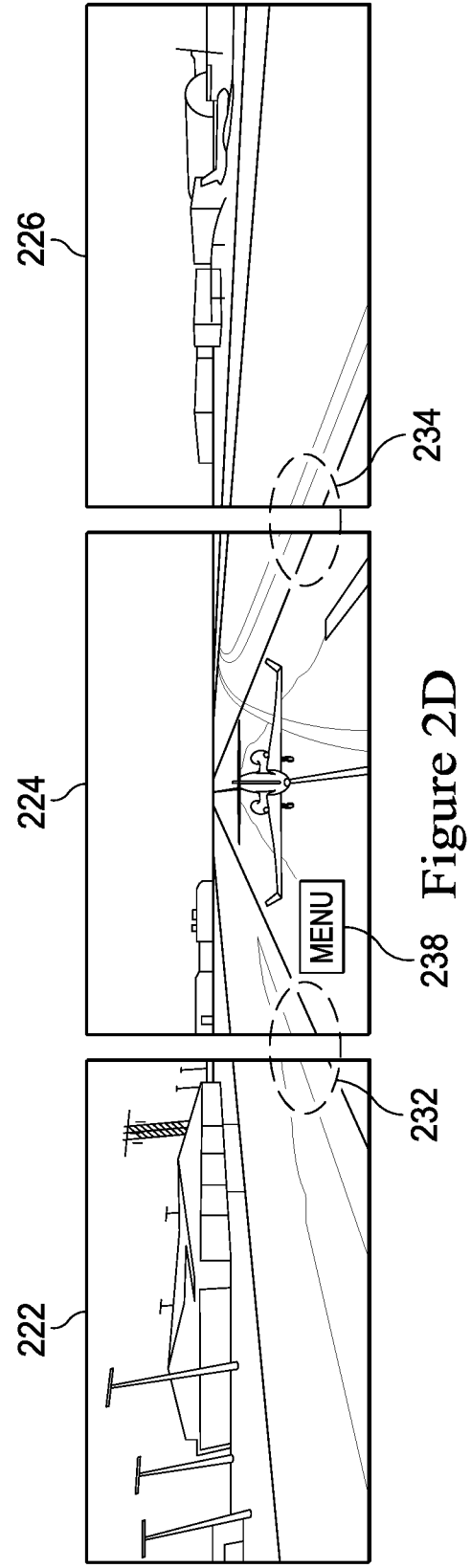
FIG. 2D shows a multiple monitor or display configuration with bezel tiling correction for an action adventure game.

FIG. 2D is an example of a multiple monitor or display configuration with bezel tiling correction for an action adventure game. In this example, bezel tiling correction is performed for the center of the image to maintain continuity of images between monitors or displays 224 with 222, and monitors or displays 224 with 226. As evident by the areas circled by sections 232 and 234 with bezel tiling correction continuity of the images is maintained. Such a mode for bezel tiling correction can be referred to as center-kept mode. In certain implementations, a "built-in" menu 238 is provided in the action adventure game. In certain implementations, if such a menu 238 resides in the center or middle of the image, and in particular at the left or right edge of monitor or display 224, the menu 238 is untouched, while bezel tiling correction is provided, taking in consideration a monitor's bezel information on adjacent monitors. This is further discussed below as to center-kept mode bezel tiling correction.

Figure 3:
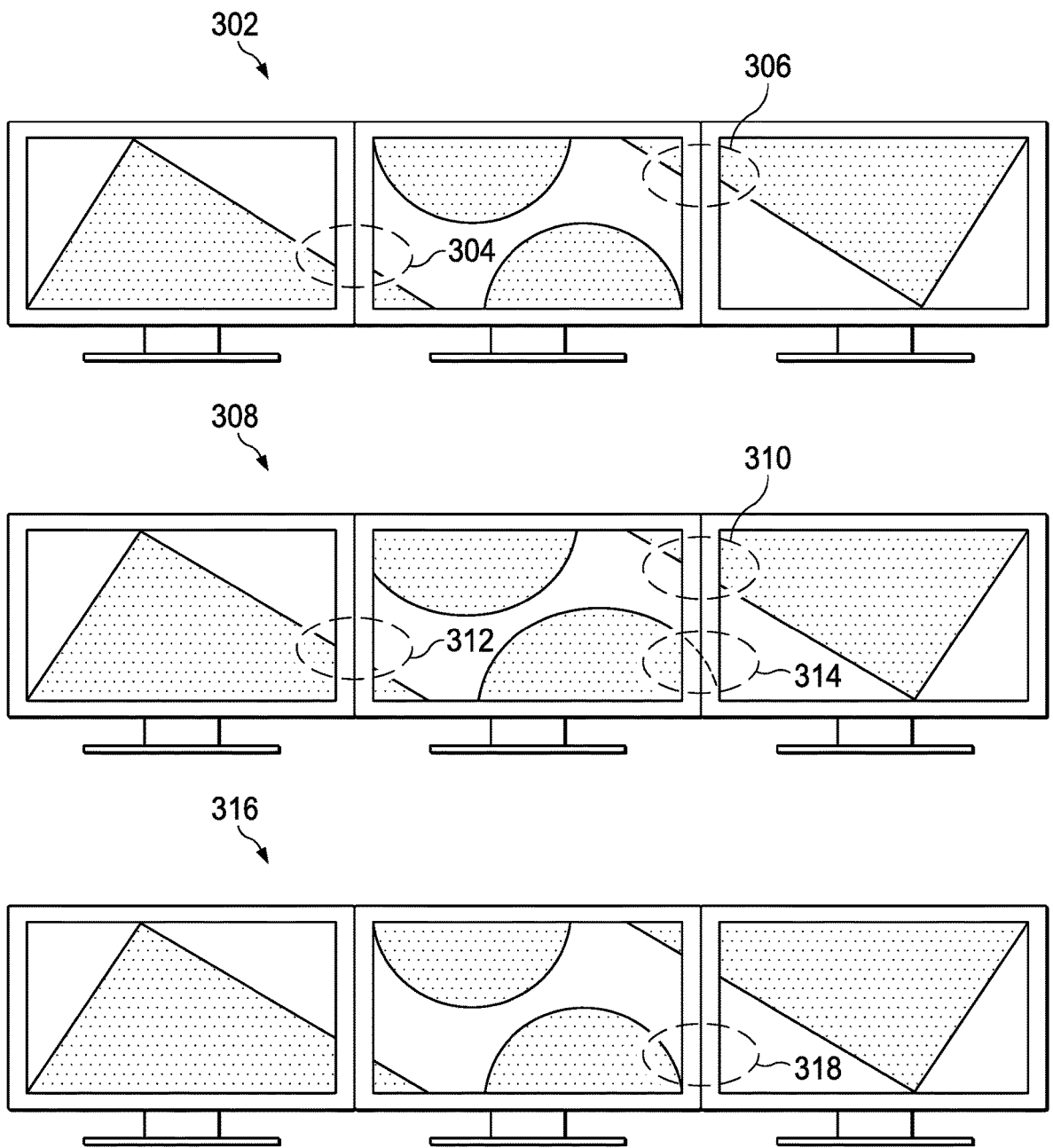
FIG. 3 shows multiple monitor or display layouts for no bezel tiling correction, standard bezel tiling correction and center-kept bezel tiling correction.

FIG. 3 are examples of no bezel tiling correction, standard bezel tiling correction and center kept correction for a multiple monitor or display 3×1 landscape layout. In such implementations, video frames are received to be displayed on the multiple monitor or displays. For configuration 302, a received frame shows image or scene discontinuity in the monitors or displays as illustrated by the areas circled by sections 304 and 306.

For configuration 308, a received frame shows image or scene continuity by interpolating the image elements of the frame. Standard mode bezel tiling correction can be referred to for configuration 308. For standard mode, a cropped frame is linearly scaled up and fills a display frame buffer for each display set. In other words, a cropped frame is linearly scaled up and fills up the display frame buffer for every display. Image or scene continuity is maintained by bezel tiling correction as shown by areas circled by sections 310, 312 and 314. Interpolation of the image elements is provided in the bezels; however, as shown in area circle by section 314, the dotted portion shows that part of the image element is "hidden" by the bezels. For certain applications, where such image element conveys important information such as a menu of application (e.g., menu 238), hiding portions of the image element is not acceptable.

For configuration 316, a received frame shows image or scene continuity, but maintains image elements in the center monitor or display. Center-kept mode bezel tiling correction can be referred to for configuration 316. In center-kept mode, the center monitor or display is unchanged while the adjacent monitors or displays are non-linearly scaled up by taking the center display's bezel into consideration. In center-kept mode, the image or scene of the center monitor or display is kept as original without scaling. For the monitors or display at the left or right side of the center monitor or display, linear/nonlinear can be applied by partitioning of image frame, e.g., linear scaling can be applied to the half of the image frame adjacent to the center monitor or display and non-linear scaling can be applied to the other half of image frame. Similarly, for other layouts like 1×3 landscape, for a monitor or display on the top or at the bottom, linear scaling can be applied to the half of the frame adjacent to the center display and non-linear scaling to the other half of frame while keeping center monitor's image or scene untouched.

Center-kept mode can be used for certain application scenes, such as games with built-menus (e.g., menu 238) or software applications with corner menu buttons in the center view monitor or display, where a user can want desire to keep frame information integrity with full corner access in the center monitor or display while accepting more tolerance (i.e., bezel tiling correction) on adjacent displays or monitors.

Figure 4:
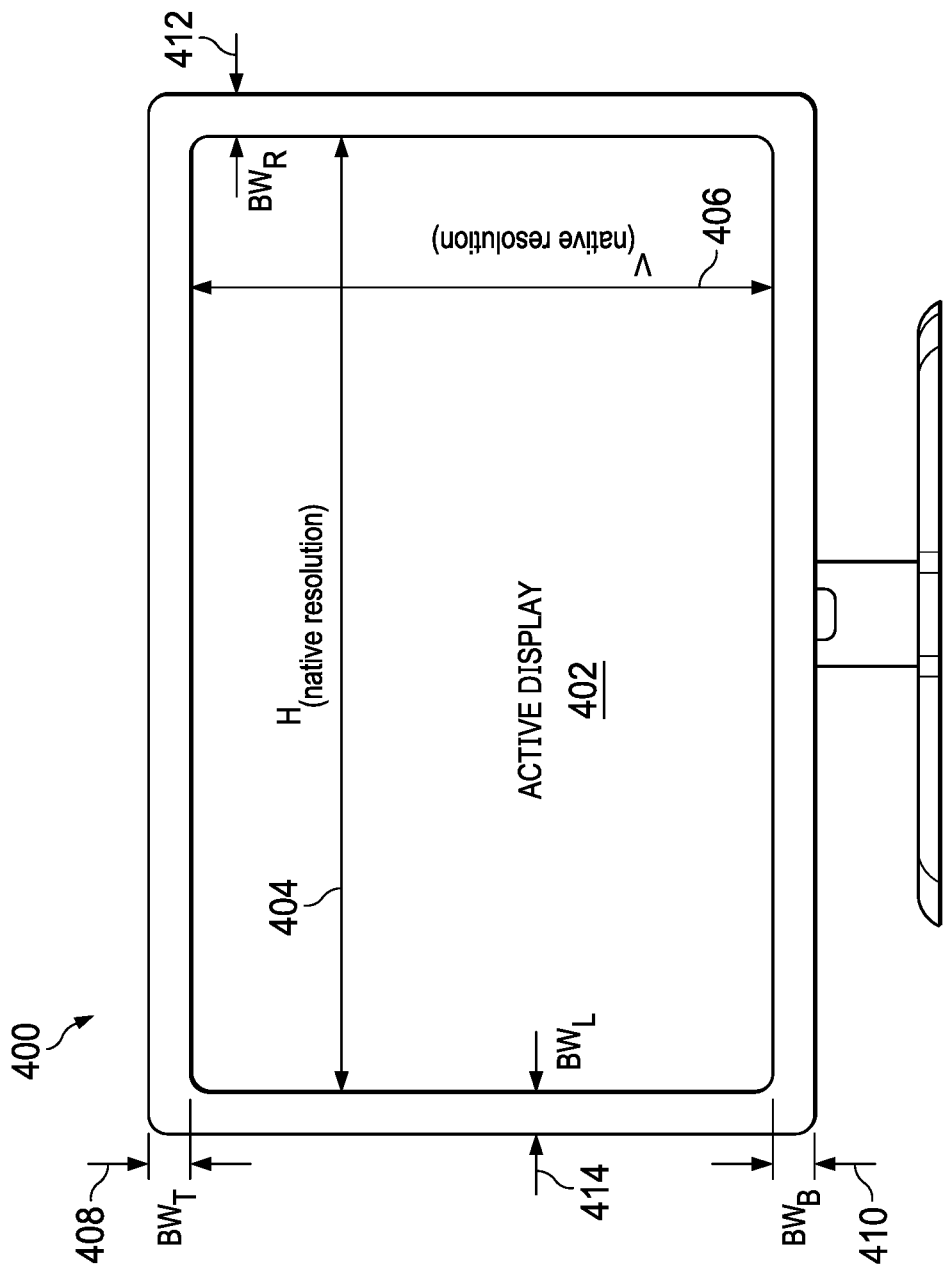
FIG. 4 is a generalized monitor or display showing bezel dimensions and active image display area.

FIG. 4 is a generalized monitor or display 400 showing bezel dimensions and active image display area. Bezel dimensions can be pre-stored firmware (i.e., scalar chip 120) of the monitor or display 400. As further described below, bezel dimensions can also be edited, for example with an OSD or application.

An active display 402 showing a frame image or scene on monitor or display 400 is defined by the dimensions of H or horizontal pixels at native resolution 404 and vertical pixels at native resolution 406. The active display 402 shows an image or scene that is made up of a certain number of pixels. The bezel of the monitor or display 400 will "hide" a number of pixels of the frame image or scene. The amount of pixels that are hidden in by the bezel can depend on the monitor or display size.

Monitor or display 400 is defined by bezel dimensions as follows: bezel width top or $BW_T$ 408; bezel width bottom or $BW_B$ 410; bezel width right or $BW_R$ 412; and bezel width left or $BW_L$ 414. Example values for a 27 inch (measured diagonally) monitor or display 400, for a panel pixel pitch (pp) of 0.2331 mm and a native resolution of 2560×1440 pixels: $BW_T$ 408=5.3 mm or 23 pixels; $BW_B$ 410=8.3 mm or 36 pixels; $BW_R$ 412=5.3 mm or 23 pixels; and $BW_L$ 414=5.3 mm or 23 pixels. Example values for a 24 inch (measured diagonally) monitor or display 400, for a panel pixel pitch (pp) of 0.2775 mm and a native resolution of 1920×1080 pixels: $BW_T$ 408=5.3 mm or 19 pixels; $BW_B$ 410=8.3 mm or 30 pixels; $BW_R$ 412=5.3 mm or 19 pixels; and $BW_L$ 414=5.3 mm or 19 pixels.

For bezel tiling correction, such as in standard mode or center-kept, frame pixels can be cropped. To determine the number of pixels that are cropped, an algorithm is used. For monitor or display 400 the following parameters are defined: Bph=Bezel pixel horizontal; Bpv=Bezel pixel vertical; Hc=horizontal pixels at current resolution; Vc=vertical pixels at current resolution; H=horizontal pixels at native resolution; V=vertical pixels at native resolution; BW=bezel width; pp=pixel pitch.

For certain implementations, bezel width (BW) and pixel pitch (pp) are pre-stored in display firmware, such as in scaler 120, to calculate how many pixels to be cropped. Example values for BW bezel width (BW) is 5.3 mm and pixel pitch (pp) is 0.2745 mm for a 24 inch (measured diagonally) monitor or display.

To calculate the number of pixels that are covered by the bezels, calculations for Bph or bezel pixel horizontal, and Bpv or bezel pixel vertical are performed using the following equations:

$$Bph = \frac{BW * Hc}{H * pp}$$

$$Bpv = \frac{BW * Vc}{V * pp}$$

Example values for Hc or horizontal pixels at current resolution is 1024; Vc=vertical pixels at current resolution is 768; H or horizontal pixels at native resolution; and V or vertical pixels at current resolution for a 24 inch (measured diagonally) monitor or display.

For certain implementations, pixel scaling is performed for certain bezel tiling correction modes. The following are examples:

For standard mode, examples of scaling ratios are:
For a 3×1 landscape configuration, V_scaling=1, where H scaling ratio is set to the following:
   a) for monitors or displays at left and right sides:
      H_scaling=(Hc+Bph)/Hc
   b) for monitor or display in-between or in the center:
      H_scaling=(Hc+2*Bph)/Hc
For a 1×3 landscape configuration, H_scaling=1, were V scaling ratio is set to the following:
   a) for monitors or displays at top and bottom:
      V_scaling=(Vc+Bpv)/Vc
   b) for monitor or display in-between or in the center:
      V_scaling=(Vc+2*Bpv)/Vc
For center-kept mode, examples of scaling ratios are:
For a 3×1 landscape configuration, V_scaling=1, where H scaling ratio is set to the following:
   a) for monitors or displays at left and right sides:
      H_scaling=(Hc+2*Bph)/Hc
   b) for monitors or displays in-between or in the center:
      H_scaling=1
For a 1×3 landscape configuration, H_scaling=1, were V scaling ratio is set to the following:
   a) for monitors or displays at top and bottom:
      V_scaling=(Vc+2*Bpv)/Vc
   b) for monitor or display in-between or in the center
      V_scaling=1

Depending on the bezel tiling correction mode and position of a monitor or display in a multiple monitor or display configuration, the total number of pixels to be cropped in horizontal and vertical are calculated by the following:
   H_cropping=Hc*(H_scaling−1)
   V_cropping=Vc*(V_scaling−1)

Furthermore, depending on the position of a monitor or display in a multiple monitor or display configuration, the following can be used to determine how pixels are cropped from the total number of active pixels. H_cropping_left and H_cropping_right denote pixels to be cropped from left edge and right edge of each line. V_cropping_top, V_cropping_bottom denote lines to be cropped from top edge and bottom edge of each frame.

As an example for a 3×1 landscape configuration:
For cropped pixels in the horizontal:
   a) monitor or display on the left:
      H_cropping_left=0,
      H_cropping_right=H_cropping
   b) monitor or display on the right:
      H_cropping_left=H_cropping,
      H_cropping_right=0
   c) monitor or display in-between or in the center:
      H_cropping_left=H_cropping/2,
      H_cropping_right=H_cropping/2
As an example for a 1×3 landscape configuration:
For cropped pixels in the vertical:
   a) monitor or display at the top:
      V_cropping_top=0,
      V_cropping_bottom=V_cropping
   b) display at the bottom
      V_cropping_top=V_cropping,
      V_cropping_bottom=0
   c) display in between
      V_cropping_top=V_cropping/2,
      V_cropping_bottom=V_cropping/2

Therefore, as an example in a 3×1 landscape configuration, where there are left, center, and right monitors or displays, with no bezel tiling correction, no pixels are cropped from the left, center and right monitors or displays. In standard mode bezel tiling correction, pixels at the right bezel of the left monitor are cropped; pixels at both the left and right bezels of the center monitor or display are cropped; pixels at the left bezel of the right monitor or display are cropped. In center-kept bezel tiling correction, pixels at the right bezel of the left monitor or display and pixels at the left side of the right monitor or display are cropped; no pixels are cropped for the center monitor or display In certain implementations, frame scaling is performed. In standard mode bezel tiling correction, a cropped frame is linearly scaled up and fills up the display frame buffer for every display. As discussed, H_scaling and V_scaling are respective horizontal and vertical scaling factors. For center-kept mode bezel tiling correction, the center monitor or display is kept as original without scaling (H_scaling=1 and V_scaling=1). For monitors or displays at the left or right side, linear scaling can be, but not limited to, applied to the half of the frame/image adjacent to the center monitor or display and non-linear scaling to the other half of frame/image. Similarly, for a monitor or display on the top or at the bottom a configuration, linear scaling can be but not limited to applied to the half of the frame/image adjacent to the center monitor or display and non-linear scaling to the other half of frame/image.

In certain implementations, partitioning of linear and non-linear portions of the frame/image and the respective scaling factors can be decided by application type, display size or rendering style. A pre-defined table can be used for look-up. And the corresponding values will be applied to the two half frames/images.

Figure 5:
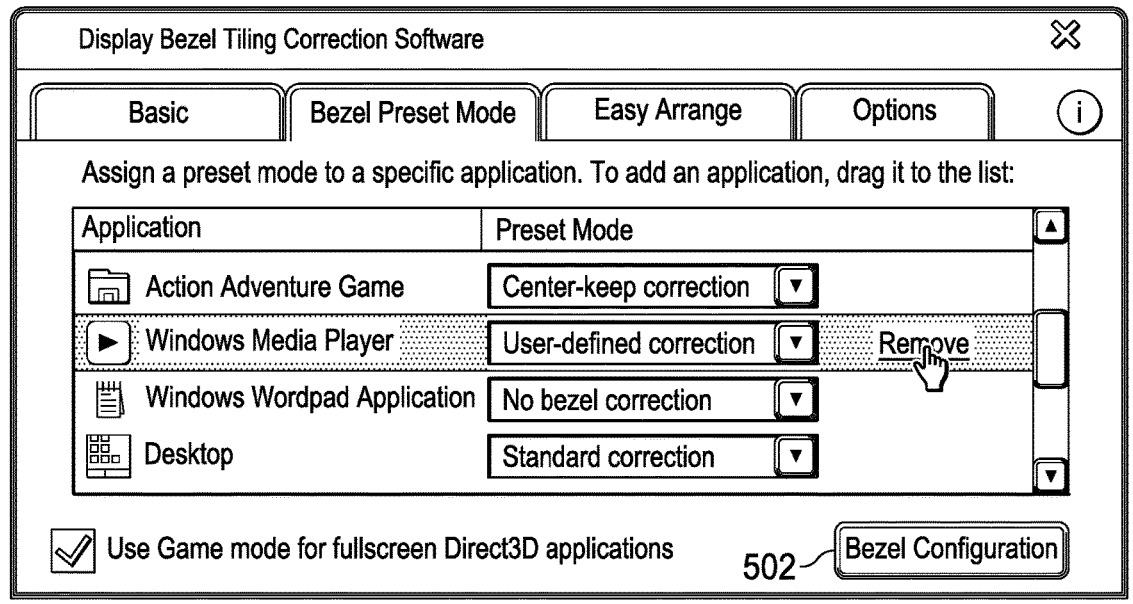
FIG. 5 shows a user interface that manages bezel tiling correction for a multiple monitor or display configuration.

FIG. 5 shows a user interface or UI 500 to manage bezel tiling correction. In certain implementations, the UI 500 can be presented as part of a settings program or OSD control software provided by computer 102 as part of computing system 100. UI 500 can identify and manage various applications, such as software programs, games, and multimedia presentations (e.g., movies, videos, etc.). Based on the particular application that is being displayed on a multiple monitor or display configuration, a particular bezel tiling correction mode can be performed on particular monitors or displays. In certain implementations, a user desires to configure bezel tiling correction on certain monitors or displays. In such cases, a user can select bezel configuration 502 on UI 500.

Figure 6:
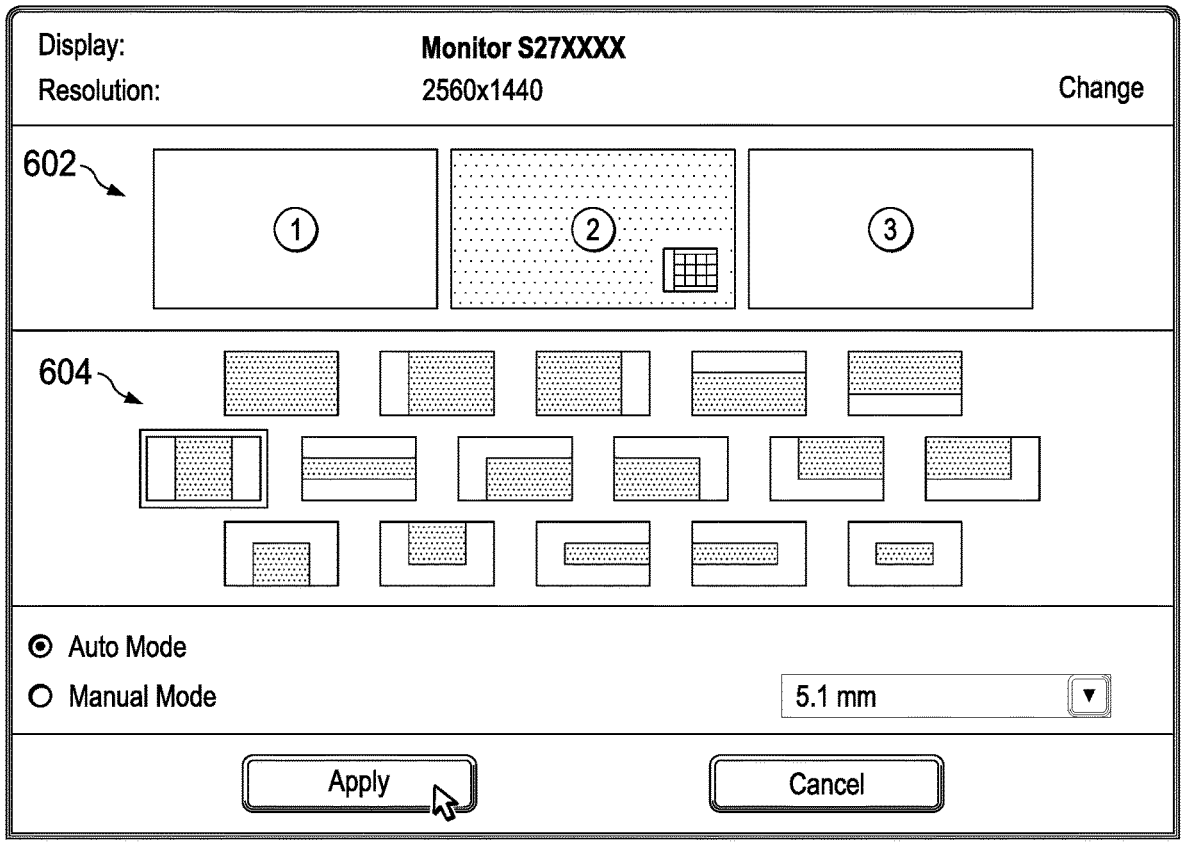
FIG. 6 shows a submenu user interface that allows a user to select bezel configuration for a particular monitor or display.

FIG. 6 is a submenu 600 of UI 500 that is called when a user selects bezel configuration 502. The submenu 600 allows a user to select a monitor or display from the current configuration from selections 602. After choosing the particular monitor or display from selections 602, a user can choose a particular bezel tiling correction, frame scaling and cropping from selections 604.

Figure 7:
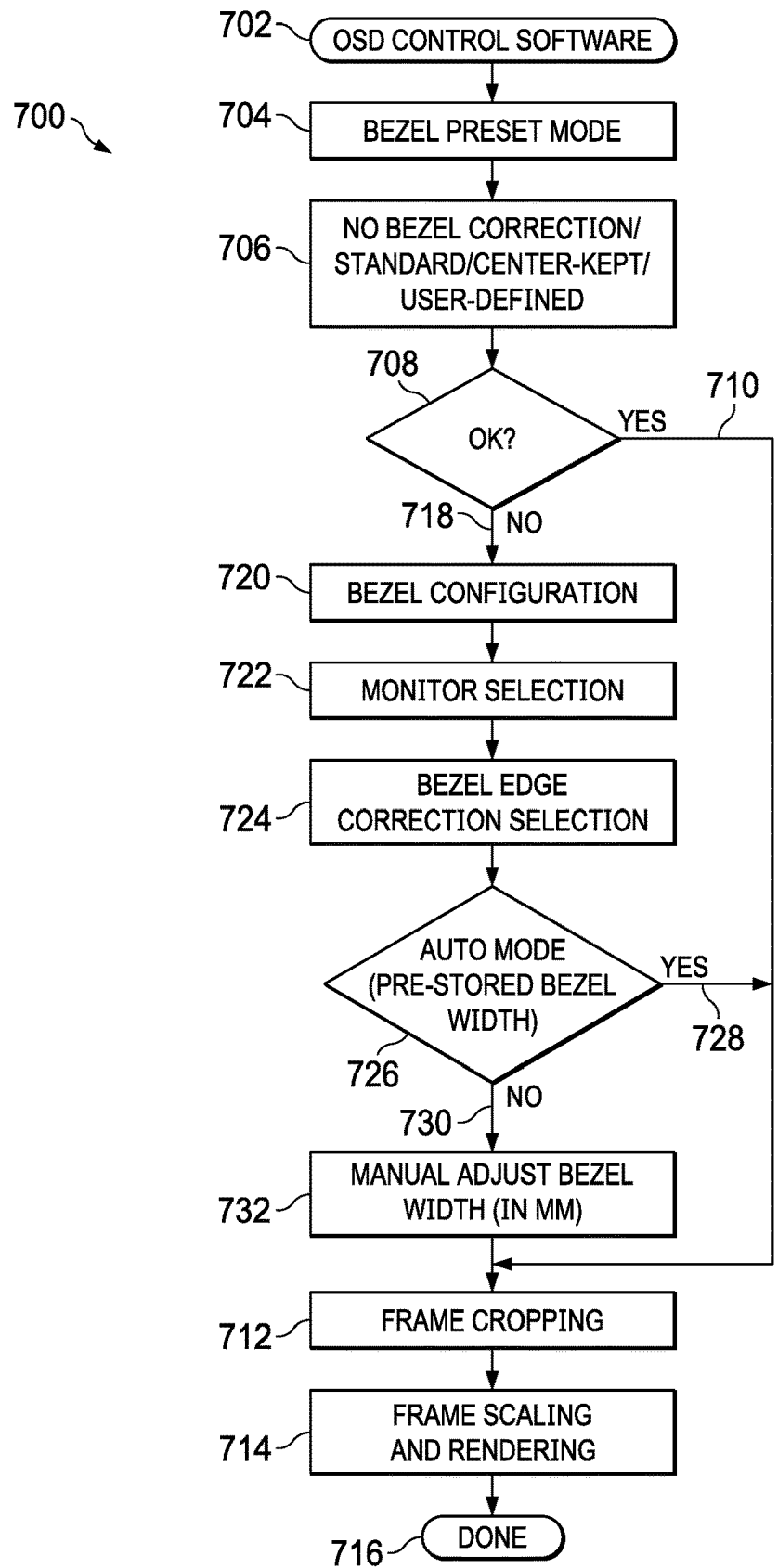
FIG. 7 shows a flow chart for bezel configuration for a particular monitor or display.

Referring to FIG. 7, a flow chart 700 to adjust for bezel tiling correction. In certain implementations, such a flow chart 700 can describe the process when a user calls up UI 500. In this example, the process flow chart 700 starts at step 702 wherein an OSD control software is initiated. At step 704, determination is made as to present bezel mode. At step 706, further determination is made as to the specific bezel tiling correction mode, such a no bezel tiling correction, standard mode, center-kept or user defined. At block 708, at determination is made if a user needs to manually adjust or determine bezel tiling correction. If a user does not desire to adjust or determine bezel tiling correction, following the "YES" branch 710 of block 708, at step 712 frame cropping is performed. At step 714, frame scaling and rendering are performed. At step 716, the flow chart 700 is completed. If a user does desire to adjust or determine bezel tiling correction, following the "NO" branch 718 of block 708, at step 720 bezel configuration is performed. At step 722 a monitor or display of the configuration is chosen. At step 725, bezel edge correction is selected for that chosen monitor or display. In certain instances, the chosen monitor or display's width is predetermined/known. At block 726, a determination is made if the bezel width is known. If the bezel width is known, then following the "YES" branch 728 of block 726, at step 712 frame cropping is performed. At step 714, frame scaling and rendering are performed. At step 716, the flow chart 700 is completed. If the bezel width is to be adjusted, then following the "NO" branch 730 of block 726, at step 732 manual bezel adjusting is performed. At step 714, frame scaling and rendering are performed. At step 716, the flow chart 700 is completed.

As will be appreciated by one skilled in the art, the present invention can be embodied as a method, system, or computer program product. Accordingly, embodiments of the invention can be implemented entirely in hardware, entirely in software (including firmware, resident software, microcode, etc.) or in an embodiment combining software and hardware. These various embodiments can all generally be referred to herein as a "circuit," "module," or "system." Furthermore, the present invention can take the form of a computer program product on a computer-usable storage medium having computer-usable program code embodied in the medium.

Any suitable computer usable or computer readable medium can be utilized. The computer-usable or computer-readable medium can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium can be any medium that can contain, store, communicate, or transport the program for use by or in connection with the instruction execution system, apparatus, or device.

Computer program code for carrying out operations of the present invention can be written in an object oriented programming language such as Java, Smalltalk, C++ or the like. However, the computer program code for carrying out operations of the present invention can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing bezel tiling correction, comprising:
   providing information regarding multiple monitor configuration of a computing system;
   providing bezel widths of monitors of the multiple monitor configuration;
   performing bezel width correction on particular monitors of the multiple monitor configuration based on different bezel compensation modes linked to application types, wherein a bezel tiling correction mode is switched to a pre-defined list when switching applications.

2. The method of claim 1, wherein the bezel tiling correction mode is one of a number of preset modes that are correlated to particular software applications that provide the frames/images that are displayed on the monitor.

3. The method of claim 1, wherein the monitors provide information regarding multiple monitor configuration is from the monitors and bezel widths to an on screen display (OSD) control application that reads bezel data of the monitors, displays the array position of the monitors and performs auto switching between bezel tiling correction modes.

4. The method of claim 1, wherein the determining bezel widths of the monitors is selected from predetermined values or performed by a user.

5. The method of claim 1, wherein the performing bezel width correction comprises:
   scaling the frames/images on the particular monitors and cropping pixels of the scaled frames/images that are hidden by the bezels of the particular monitors based on the bezel tiling correction mode.

6. The method of claim 5, wherein the performing bezel width correction is performed by scaler chips in the monitors of the multiple monitor configuration.

7. The method of claim 5, wherein the scaling the frames/images is performed by scaler chips in the monitors which regenerate frame/image pixels from a graphics card.

8. A monitor comprising:
   an interface board;
   a connection couple to the interface board that connects with a computer;
   a scaler chip that resides on the interface board configured to process non-transitory, computer-readable storage medium embodying computer program code, the non-transitory, computer-readable storage medium, the computer program code interacting with a plurality of computer operations and comprising instructions for:
   sending bezel data information to the computer;
   receiving frames/images from the computer;
   performing bezel width correction based on different bezel compensation modes linked to application types, wherein a bezel tiling correction mode is switched to a pre-defined list when switching applications.

9. The monitor of claim 8, wherein the bezel data information and other information regarding the monitor are sent to an on screen display (OSD) control application of the computer that reads bezel data of the monitor, displays the array position of the monitor and other monitors in a multiple monitor display configuration, and performs auto switching between bezel tiling correction modes.

10. The monitor of claim 9, wherein the OSD control application provides a number of preset bezel tiling correction modes that are correlated to particular software applications that provide the frames/images received from the computer.

11. The monitor of claim 8, wherein the sending bezel information includes bezel widths of the monitor.

12. The monitor of claim 8, wherein the performing bezel width correction comprises:
   scaling the frames/images, and cropping pixels of the scaled frames/images that are hidden by the bezels of the monitor, based on the bezel tiling correction mode.

13. The monitor of claim 12, wherein the scaling the frames/images comprises regenerating frame/image pixels from a graphics card of the computer.

14. A non-transitory, computer-readable storage medium embodying computer program code, the computer program code comprising computer executable instructions configured for:
   sending bezel width information to a computer;
   receiving frames/images from the computer from a particular application;
   performing bezel width correction based on different bezel compensation modes linked to application types, wherein a bezel tiling correction mode is switched to a pre-defined list when switching applications.

15. The non-transitory, computer-readable storage medium of claim 14, wherein the computer executable instructions are further configured for:
   receiving data from an operating system on the computer as to performing the bezel width correction.

16. The non-transitory, computer-readable storage medium of claim 14, wherein the computer executable instructions are further configured for:
   receiving data from an operating system on the computer as other monitors that are part of a multiple monitor configuration.

17. The non-transitory, computer-readable storage medium of claim 14, wherein the computer executable instructions are further configured for:
   providing the ability to manually adjust the bezel widths of the monitor based on the bezel tiling correction mode.

18. The non-transitory, computer-readable storage medium of claim 14, wherein the computer executable instructions are further configured for:
   providing the ability to auto switch between bezel tiling correction modes.

19. The non-transitory, computer-readable storage medium of claim 14, wherein the performing bezel width correction comprise:
   scaling the frames/images, and cropping pixels of the scaled frames/images that are hidden by the bezels of the monitor, based on the bezel tiling correction mode.

20. The non-transitory, computer-readable storage medium of claim 19, wherein scaling the frames/images comprises regenerating frame/image pixels from a graphics card of the computer.

* * * * *